US012585140B2

(12) United States Patent (10) Patent No.: US 12,585,140 B2
Otsubo (45) Date of Patent: Mar. 24, 2026

(54) REFLECTION-TYPE AERIAL IMAGE FORMATION DEVICE AND REFLECTION-TYPE AERIAL IMAGE FORMATION METHOD

(71) Applicant: Asukanet Company, Ltd., Hiroshima (JP)

(72) Inventor: Makoto Otsubo, Hiroshima (JP)

(73) Assignee: Asukanet Company, Ltd., Hiroshima (JP)

( * ) Notice: Subject to any disclaimer, the term of this patent is extended or adjusted under 35 U.S.C. 154(b) by 413 days.

(21) Appl. No.: 18/265,821

(22) PCT Filed: Mar. 10, 2022

(86) PCT No.: PCT/JP2022/010676
§ 371 (c)(1),
(2) Date: Jun. 7, 2023

(87) PCT Pub. No.: WO2022/224613
PCT Pub. Date: Oct. 27, 2022

(65) Prior Publication Data
US 2024/0027786 A1     Jan. 25, 2024

(30) Foreign Application Priority Data

Apr. 21, 2021   (JP) ................................ 2021-071978

(51) Int. Cl.
G02B 30/56       (2020.01)
G02B 30/60       (2020.01)
(52) U.S. Cl.
CPC ............. G02B 30/56 (2020.01); G02B 30/60 (2020.01)

(58) Field of Classification Search
None
See application file for complete search history.

(56) References Cited

U.S. PATENT DOCUMENTS

| | | | |
|---|---|---|---|
| 2010/0110384 A1 | 5/2010 | Maekawa | |
| 2012/0092766 A1 | 4/2012 | Maekawa et al. | |
| 2014/0253880 A1 | 9/2014 | Yoneno | |
| 2018/0364868 A1* | 12/2018 | Otsubo | ................. G06F 3/0412 |
| 2019/0179160 A1* | 6/2019 | Ito | ...................... G02B 26/0816 |
| 2020/0183183 A1 | 6/2020 | Oyama | |

(Continued)

FOREIGN PATENT DOCUMENTS

| | | |
|---|---|---|
| JP | 2010-262228 A | 11/2010 |
| JP | 2014-067071 A | 4/2014 |

(Continued)

OTHER PUBLICATIONS

Extended European Search Report dated Sep. 24, 2024, issued in counterpart Application No. 22791394.4. (8 pages).

(Continued)

*Primary Examiner* — Jyotsna V Dabbi
(74) *Attorney, Agent, or Firm* — WHDA, LLP

(57)                ABSTRACT

A reflection-type aerial image formation device includes a first reflecting mirror placed on a side of a first optical control unit of an optical image formation means so as to face the first optical control unit at an interval and a second reflecting mirror placed on a side of a second optical control unit of the optical image formation means so as to face the second optical control unit at an interval.

6 Claims, 4 Drawing Sheets

(56)                    References Cited

U.S. PATENT DOCUMENTS

| 2020/0344461 | A1 | 10/2020 | Masumura et al. |
| 2022/0365363 | A1 | 11/2022 | Wang et al. |

FOREIGN PATENT DOCUMENTS

| JP | 2016-142802 | A | 8/2016 |
| JP | 2018-105966 | A | 7/2018 |
| JP | 2020-60752 | A | 4/2020 |
| JP | 2020-064086 | A | 4/2020 |
| JP | 2020-181160 | A | 11/2020 |
| JP | 6847291 | B1 | 3/2021 |
| WO | 2008/123500 | A1 | 10/2008 |
| WO | 2009/131128 | A1 | 10/2009 |
| WO | 2021/052104 | A1 | 3/2021 |

OTHER PUBLICATIONS

International Search Report dated May 31, 2022, issued in counterpart International application No. PCT/JP2022/010676, with English translation. (6 pages).

Decision to Grant a Patent dated Aug. 16, 2022, issued in counterpart JP application No. 2022-541292, with English translation. (5 pages).

Office Action dated Sep. 22, 2025, issued in corresponding Chinese patent application No. 202280006287.1 with English translation (6 pages).

\* cited by examiner

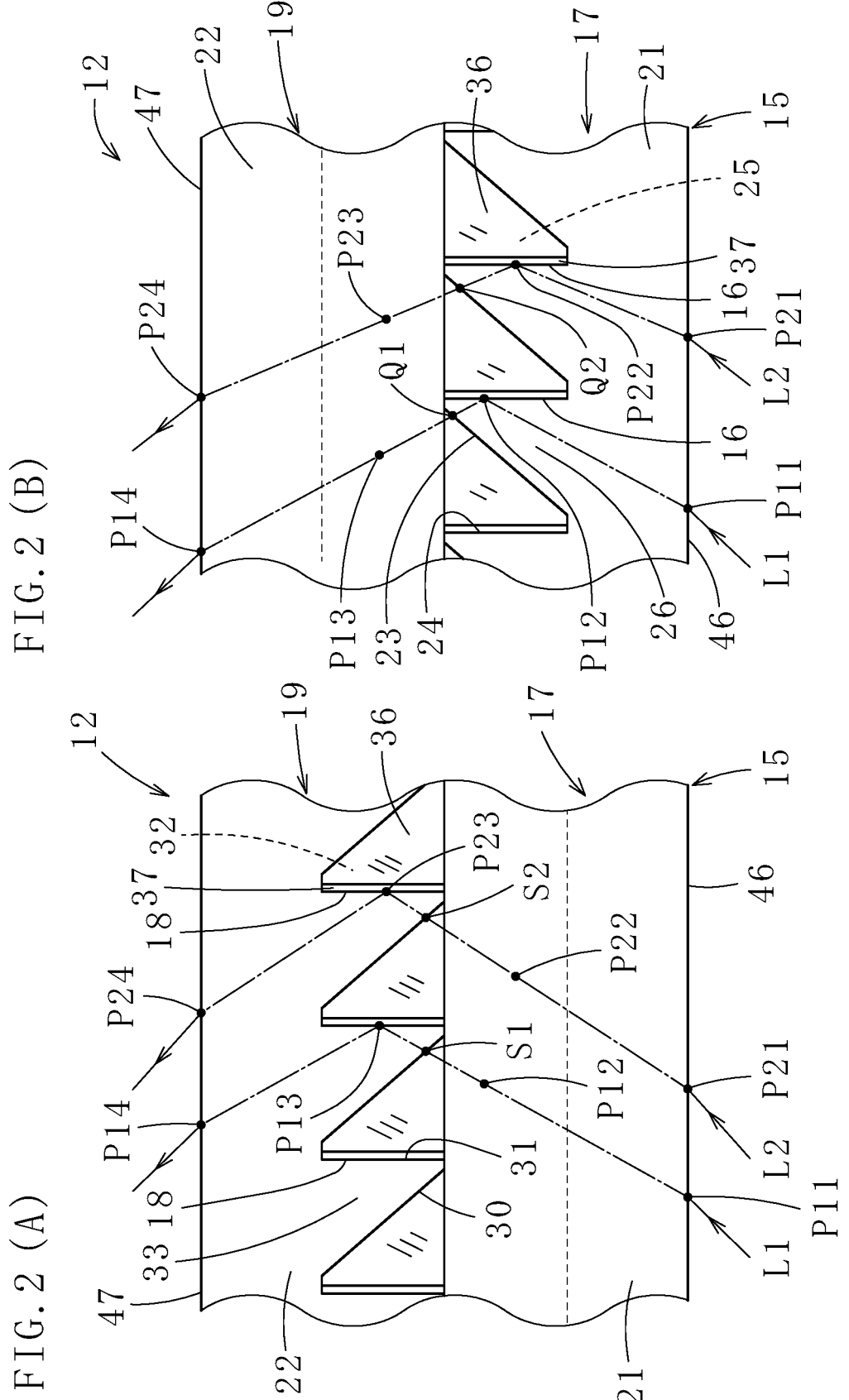
F I G . 2 (A)
F I G . 2 (B)

REFLECTION-TYPE AERIAL IMAGE FORMATION DEVICE AND REFLECTION-TYPE AERIAL IMAGE FORMATION METHOD

TECHNICAL FIELD

The present invention relates to a reflection-type aerial image formation device and a reflection-type aerial image formation method which use an optical image formation means for forming the image displayed on a display means into an aerial image.

BACKGROUND ART

As a device that forms an aerial image (stereoscopic image) of an object in the air by using light (scattered light) emitted from an object surface, for example, there is available an optical image formation device (optical image formation means) disclosed in patent literature 1.

This optical image formation device includes first and second optical control panels formed by arranging, inside two transparent flat panels, light reflecting surfaces formed from many band-shaped reflecting metal surfaces (mirror surfaces) perpendicular over the thickness direction of the transparent flat panels at a predetermined pitch. One-surface sides of the first and second optical control panels are made to face and tightly adhere to each other such that the light reflecting surfaces of the first and second optical control panels are orthogonal to each other in planar view. This optical image formation device can cause the image displayed on a display means such as a display to float in the air by forming the light emitted by the display means into an image in the air as well as forming a stereoscopic image of an object having a three-dimensional shape in the air. As a device using this optical image formation device, for example, an aerial touch panel like that disclosed in patent literature 2 has also been proposed.

CITATION LIST

Patent Literature

Patent Literature 1: WO 2009/131128
Patent Literature 2: Japanese Patent Laid-Open No. 2014-67071

SUMMARY OF INVENTION

Technical Problem

However, this optical image formation device has the following problem because an aerial image of an object is formed symmetrically with the object through the optical image formation device. Assume that this device is structured such that the display means is placed on the lower side of the optical image formation device placed horizontally, and the image displayed on the display means is formed into an aerial image on the upper side of the optical image formation device. In this case, the vertical distance from the display means to the optical image formation device is equal to the vertical distance from the optical image formation device to the aerial image. That is, the vertical distance from the display means to the aerial image is twice the vertical distance from the display means to the optical image formation device. This makes it necessary to require a large occupancy space in the height direction. Alternatively, assume that the optical image formation device is structured such that the display means is placed on the depth side of the device placed vertically, and the image displayed on the display means is formed into an aerial image on the front side of the device. In this case, the horizontal distance from the display means to the optical image formation device is equal to the horizontal distance from the optical image formation device to the aerial image. That is, the horizontal distance from the display means to the aerial image is twice the horizontal distance from the display means to the optical image formation device. This makes it necessary to require a large occupancy space in the depth direction.

The present invention has been made in consideration of the above problem and has as its object to provide a reflection-type aerial image formation device and a reflection-type aerial image formation method which can form a sharp aerial image with excellent visibility without reducing the viewing angle by maintaining the length of the optical path extending from a display means to the aerial image through an optical image formation means while miniaturizing and thinning the device by shortening the linear distances from the display means and the aerial image to the optical image formation means.

Solution to Problem

A reflection-type aerial image formation device according to the first invention in line with the above object uses optical image formation means obtained by overlaying a first optical control unit having a plurality of first light reflecting surfaces arranged parallel at intervals inside a transparent flat plate so as to be perpendicular to one surface of the transparent flat plate on a second optical control unit having a plurality of second light reflecting surfaces arranged parallel at intervals inside the transparent flat plate so as to be perpendicular to the other surface of the transparent flat plate, with the first and second optical control units being overlaid on each other in a thickness direction of the transparent flat plate so as to make the first light reflecting surfaces orthogonal to the second light reflecting surfaces in planar view. This device includes a first reflecting mirror placed on a side of the first optical control unit of the optical image formation means so as to face the first optical control unit at an interval and a second reflecting mirror placed on a side of the second optical control unit of the optical image formation means so as to face the second optical control unit at an interval. Light emitted from display means and irradiating the first reflecting mirror is reflected by the first reflecting mirror to be made incident on the first optical control unit, and light, of the light incident on the first optical control unit, which is reflected once by the first light reflecting surface to be made incident on the second optical control unit and reflected once by the second light reflecting surface to exit from the second optical control unit is reflected by the second reflecting mirror to form an image displayed on the display means into an aerial image.

The reflection-type aerial image formation device according to the first invention further includes a third reflecting mirror that is placed between the first reflecting mirror and the second reflecting mirror at a position where the third reflecting mirror does not overlap the optical image formation means and has, on obverse and reverse sides, a first reflecting surface facing the first reflecting mirror and a second reflecting surface facing the second reflecting mirror. Light emitted from the display means can irradiate the first reflecting mirror upon being reflected by the first reflecting surface, and light exiting from the second optical control unit and reflected by the second reflecting mirror can be reflected by the second reflecting surface to be formed into an image.

The reflection-type aerial image formation device according to the first invention may further be provided with detection means for detecting a position of indication means that touches the aerial image.

A reflection-type aerial image formation method according to the second invention in line with the above object uses optical image formation means obtained by overlaying a first optical control unit having a plurality of first light reflecting surfaces arranged parallel at intervals inside a transparent flat plate so as to be perpendicular to one surface of the transparent flat plate on a second optical control unit having a plurality of second light reflecting surfaces arranged parallel at intervals inside the transparent flat plate so as to be perpendicular to the other surface of the transparent flat plate, with the first and second optical control units being overlaid on each other in a thickness direction of the transparent flat plate so as to make the first light reflecting surfaces orthogonal to the second light reflecting surfaces in planar view. A first reflecting mirror is placed on a side of the first optical control unit of the optical image formation means so as to face the first optical control unit at an interval, a second reflecting mirror is placed on a side of the second optical control unit of the optical image formation means so as to face the second optical control unit at an interval, light emitted from display means and irradiating the first reflecting mirror is reflected by the first reflecting mirror to be made incident on the first optical control unit, and light, of the light incident on the first optical control unit, which is reflected once by the first light reflecting surface to be made incident on the second optical control unit and reflected once by the second light reflecting surface to exit from the second optical control unit is reflected by the second reflecting mirror to form an image displayed on the display means into an aerial image.

In the reflection-type aerial image formation method according to the second invention, a third reflecting mirror having, on obverse and reverse sides, a first reflecting surface facing the first reflecting mirror and a second reflecting surface facing the second reflecting mirror can be placed between the first reflecting mirror and the second reflecting mirror at a position where the third reflecting mirror does not overlap the optical image formation means, the first reflecting mirror can be irradiated with light emitted from the display means upon being reflected by the first reflecting surface, and light exiting from the second optical control unit and reflected by the second reflecting mirror can be formed into an image upon being reflected by the second reflecting surface.

Advantageous Effects of Invention

According to the reflection-type aerial image formation device according to the first invention and the reflection-type aerial image formation method according to the second invention, light emitted from the display means is reflected by the first reflecting mirror to be made incident on the optical image formation means (first optical control unit), and the light consecutively reflected once by each of the first and second light reflecting surfaces and exiting from the optical image formation means (second optical control unit) is reflected by the second reflecting mirror, thereby achieving reductions in the size and thickness of the device by shortening the linear distance from the display means to the optical image formation means and the linear distance from the optical image formation means to the aerial image by bending (folding) the optical path from the display means to the optical image formation means and the optical path from the optical image formation means to the aerial image.

The reflection-type aerial image formation device according to the first invention and the reflection-type aerial image formation method according to the second invention can form a sharp aerial image with excellent visibility without reducing the viewing angle while further increasing the optical path from the display means to the optical image formation means and the optical path from the optical image formation means to the aerial image without increasing the device size by reflecting light emitted from the display means to irradiate the first reflecting mirror upon reflecting the light by the first reflecting surface using the third reflecting mirror having, on the obverse and reverse sides, the first reflecting surface facing the first reflecting mirror and the second reflecting surface facing the second reflecting mirror and forming the light exiting from the optical image formation means (second optical control unit) and reflected by the second reflecting mirror into an image upon reflecting the light by the second reflecting surface.

The reflection-type aerial image formation device according to the first invention can make an aerial image function as a non-contract touch panel when the device is provided with a detection means for detecting the position of an indication means that touches the aerial image.

BRIEF DESCRIPTION OF DRAWINGS

FIGS. 2(A) and 2(B) are respectively a sectional front view and a sectional side view of the optical image formation means of the reflection-type aerial image formation device.

DESCRIPTION OF EMBODIMENTS

A reflection-type aerial image formation device and a reflection-type aerial image formation method according to an embodiment of the present invention will be subsequently described with reference to the accompanying drawings.

Figure 1:
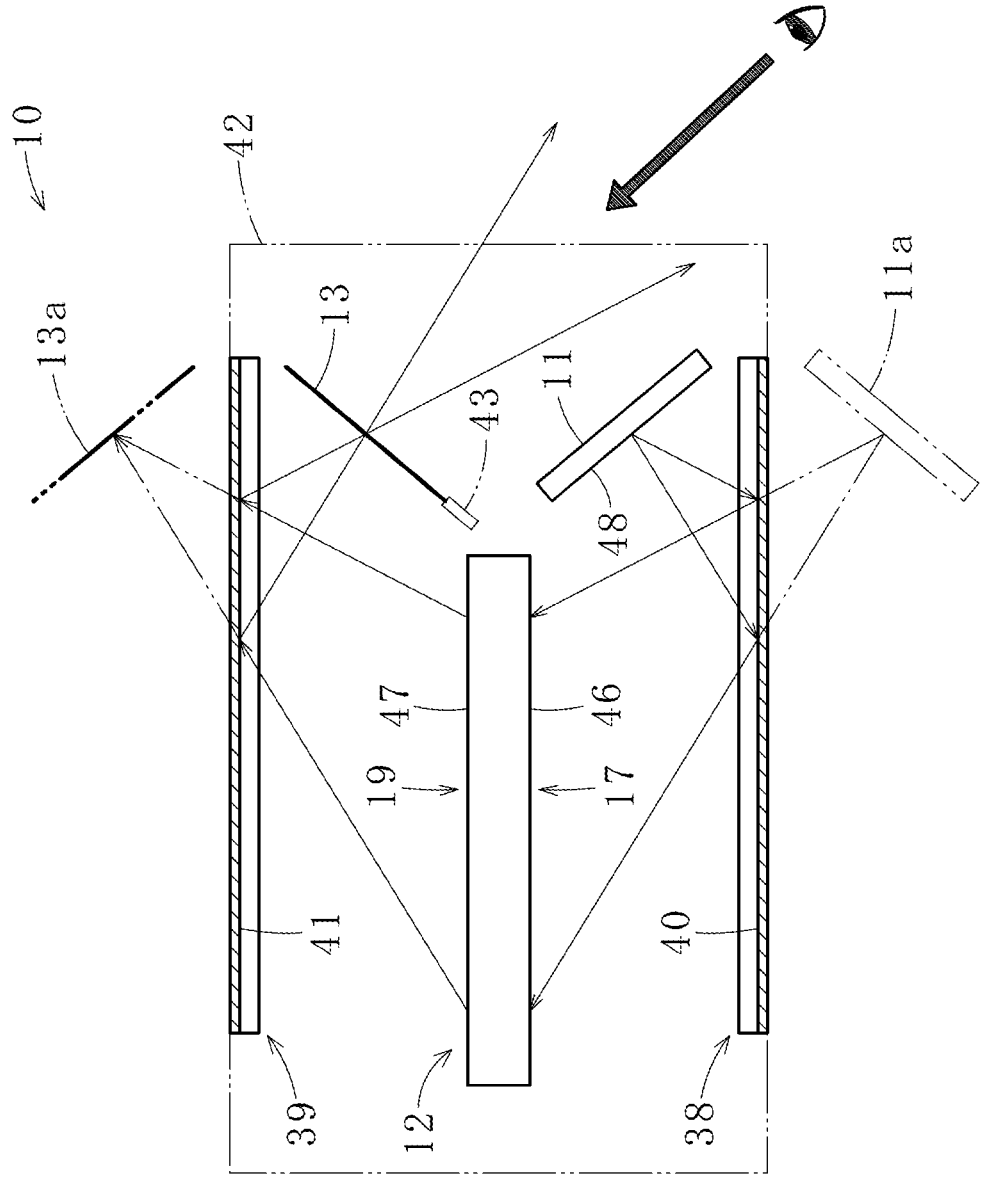
FIG. 1 is a view for explaining a reflection-type aerial image formation device according to the first embodiment of the present invention.

A reflection-type aerial image formation device 10 and a reflection-type aerial image formation method according to the first embodiment of the present invention shown in FIG. 1 are a device and a method which form the image displayed on a display means 11 into an aerial image 13 by using an optical image formation means 12. As the display means, there is available, for example, the display of a cellular phone (particularly a smartphone) or tablet terminal or the monitor of a personal computer or another device. However, they are not exhaustive, and any device including a display screen (flat screen) that displays various types of images (including characters and the like) by light emission can be used. Note that the display means may be incorporated in the reflection-type aerial image formation device in advance, or the display means on which an image on which an aerial image is based is displayed may be appropriately placed at a predetermined position.

As shown in FIG. 2, the optical image formation means 12 used in the reflection-type aerial image formation device 10 and the reflection-type aerial image formation method is obtained by overlaying a first optical control unit 17 having a plurality of first light reflecting surfaces 16 arranged parallel at intervals inside a transparent flat plate 15 so as to be perpendicular to one surface of the transparent flat plate 15 on a second optical control unit 19 having a plurality of second light reflecting surfaces 18 arranged parallel at intervals inside the transparent flat plate 15 so as to be perpendicular to the other surface of the transparent flat plate 15. The first and second optical control units 17 and 18 are overlaid on each other in the thickness direction of the transparent flat plate 15 such that the first light reflecting surfaces 16 are orthogonal to the second light reflecting surfaces 18 in planar view. Note that, in this embodiment, a first transparent plate member 21 on which the plurality of first light reflecting surfaces 16 forming the first optical control unit 17 are formed is overlaid (jointed) on a second transparent plate member 22 on which the plurality of second light reflecting surfaces 18 forming the second optical control unit 19 are formed, thus preparing the optical image formation means 12.

In this case, the first optical control unit 17 has a plurality of grooves 25 with triangular cross-sections, each having an inclined surface 23 and a vertical surface 24, and a plurality of ridges 26 with triangular cross-sections, each formed between the adjacent grooves 25, arranged at a predetermined pitch on the other side of the first transparent plate member 21. The first light reflecting surface 16 is formed on only the vertical surface 24 of each groove 25.

The second optical control unit 19 has a plurality of grooves 32 with triangular cross-sections, each having an inclined surface 30 and a vertical surface 31, and a plurality of ridges 33 with triangular cross-sections, each formed between the adjacent grooves 32, arranged at a predetermined pitch on one side of the second transparent plate member 22. The second light reflecting surface 18 is formed on only the vertical surface 31 of each groove 32.

The grooves 25 and 32 arranged to face each other are filled with a transparent resin 36.

Note that refractive indices $\eta 1$ and $\eta 2$ of the first and second transparent plate members 21 and 22 are preferably the same, and a refractive index $\eta 3$ of the transparent resin 36 filled between them preferably falls within the range of 0.8 times to 1.2 times (more preferably 0.9 times to 1.1 times, and still more preferably 0.95 times to 1.05 times) the refractive indices $\eta 1$ and $\eta 2$ of the first and second transparent plate members 21 and 22. As the transparent resin which is the raw material of the first and second transparent plate members 21 and 22, it is possible to use a thermoplastic resin such as cycloolefin polymer, polymethylmethacrylate (acrylic resin), amorphous fluorine resin, PMMA, optical polycarbonate, fluorene polyester, or polyester sulfone. Among them, one that has a high melting point and high transparency is specifically preferably used.

The first light reflecting surface 16 and the second light reflecting surface 18 are the surfaces of metal films 37 formed on the vertical surfaces 24 and 31 of the grooves 25 and 32 and are mirror surfaces (metal reflecting surfaces). The metal films 37 are directly formed on the vertical surfaces 24 and 31 of the grooves 25 and 32 by sputtering, metal deposition, spraying of small metal particles, irradiation with ion beams, application of a metal paste, or the like, and the surfaces of the metal films 37 are preferably used as the first light reflecting surface 16 and the second light reflecting surface 18. However, the present invention is not limited to them.

A method of integrating the first and second optical control units 17 and 19 by filling the grooves 25 and 32 with the transparent resin 36 may include inserting a sheet-like transparent resin having a lower melting point than the first and second transparent plate members 21 and 22 between the other side of the first optical control unit 17 and one side of the second optical control unit 19, that is, the surfaces on the sides where the grooves 25 and 32 are formed, while they are arranged to face each other, heating and pressing the resultant structure in a vacuum state, dissolving only the transparent resin, and solidifying the resultant structure, or may include separately filling the grooves 25 and 32 with a transparent adhesive made of a transparent resin and curing the transparent adhesive while making the grooves 25 and 32 of the optical control units 17 and 19 face and butt each other. Alternatively, after each of the grooves 25 and 32 is separately filled with a transparent resin and cured, the first transparent plate member 21 and the second transparent plate member 22, each formed in a flat plate shape, can be joined to each other with a transparent adhesive or the like. As the transparent adhesive, a thermoset or two-component adhesive can be used in addition to a light curing adhesive that is cured by irradiation with ultraviolet rays or the like. In particular, in order to make the refractive index $\eta 3$ approach the refractive indices $\eta 1$ and $\eta 2$, it is preferable to use, for example, an optical adhesive made of a refractive index adjusted resin whose refractive index is adjusted.

The operation of the optical image formation means 12 will be described next.

The optical image formation means 12 can form the image displayed on the display means (not shown) into an aerial image by using light L1 and light L2, of the light emitted from the display means and incident on the first optical control unit 17 of the optical image formation means 12, which are incident from positions P11 and P21 onto the first optical control unit 17, enter the second optical control unit 19 upon being reflected once at each of positions P12 and P22 on the first light reflecting surface 16, are reflected once at each of positions P13 and P23 of the second light reflecting surface 18, and emerge from the second optical control unit 19 at positions P14 and P24, as shown in, for example, FIGS. 2(A) and 2(B). In this case, the light L1 and the light L2 are incident from the first transparent plate member 21 at Q1 and Q2 in FIG. 2(B) onto the transparent resin 36 and incident from the transparent resin 36 at S1 and S2 in FIG. 2(A) onto the second transparent plate member 22. However, since the refractive indices $\eta 1$ and $\eta 2$ of the first and second transparent plate members 21 and 22 are the same and approximate (nearly equal) to the refractive index $\eta 3$ of the transparent resin 36, a phenomenon such as total reflection or spectroscopic dispersion does not occur. Note that, although light refraction occurs at the positions P11, P21, P14, and P24, the refraction at the positions P11 and P14 cancels the refraction at the positions P21 and P24.

Although in this embodiment, referring to FIGS. 2(A) and 2(B), the left-side surfaces of the metal films 37 are the first light reflecting surface 16 and the second light reflecting surface 18, both the obverse and reverse sides (the left and right surfaces in FIGS. 2(A) and 2(B)) of each metal film can function as the first light reflecting surface and the second light reflecting surface. One of the obverse and reverse sides of the metal film selectively functions as the first light reflecting surface or second light reflecting surface in accordance with the placement (the reversal of obverse and reverse) of the first optical control unit and the second optical control unit or the entering direction of light.

This embodiment has exemplified the optical image formation means 12 formed by overlaying (joining) the first transparent plate member 21, on which the plurality of first light reflecting surfaces 16 forming the first optical control unit 17 are formed, on the second transparent plate member 22, on which the plurality of second light reflecting surfaces 18 forming the second optical control unit 19 are formed. However, the optical image formation means may be the one obtained by integrally forming the first and second optical control units on one surface side and the other surface side of one transparent flat plate. That is, an optical image formation means can be prepared by respectively forming a plurality of grooves and a plurality of ridges like those described above on one surface side and the other surface side of one transparent flat plate, respectively forming a first light reflecting surface and a second light reflecting surface on the vertical surface of each groove on one surface side and the vertical surface of each groove on the other surface side, and filling the respective grooves on one surface side and the other surface with a transparent resin. Assume that, instead of forming a mirror surface (reflecting metal surface) using a metal film on the vertical surface of each groove and filling the groove with a transparent resin, each groove is airtightly filled with a gas such as air or evacuated to use the total reflection of light. In this case, the vertical surface of each groove can be directly made to function as a light reflecting surface. In addition, it is also possible to use another conventionally known optical image formation means, as needed, such as an optical image formation means formed from first and second optical control units (optical control panels) in a flat plate shape formed by alternately stacking transparent rectangular parallelepipeds and metal films (light reflecting surfaces) like those described in patent literature 1 (FIGS. 4 to 6) or an optical image formation means having a first optical control unit with a plurality of light reflecting surfaces arranged radially and a second optical control unit with a plurality of light reflecting surfaces arranged concentrically as described in WO 2019/003730.

According to the reflection-type aerial image formation device 10 and the reflection-type aerial image formation method, as shown in FIG. 1, a first reflecting mirror 38 is placed on the first optical control unit 17 side of the optical image formation means 12 so as to face the first optical control unit 17 at an interval, and a second reflecting mirror 39 is placed on the second optical control unit 19 side of the optical image formation means 12 so as to face the second optical control unit 19 at an interval. The light emitted from the display means 11 and irradiated to the first reflecting mirror 38 is reflected by the first reflecting mirror 38 to be made incident on the first optical control unit 17. Of the light incident on the first optical control unit 17, light reflected once by the first light reflecting surface 16 to be made incident on the second optical control unit 19 and reflected once by the second light reflecting surface 18 to exit from the second optical control unit 19 is reflected by the second reflecting mirror 39, thereby forming the image displayed on the display means 11 into the aerial image 13.

A virtual image 11a of the display means 11 which is drawn with a virtual line at a position symmetrical with the display means 11 through a reflecting surface (mirror surface) 40 of the first reflecting mirror 38 corresponds to the position of the conventional display means 11 when the optical image formation means 12 (the first optical control unit 17) is directly irradiated with light emitted from the display means 11 without using the first reflecting mirror 38. A virtual image 13a of the aerial image 13 which is drawn with the virtual line at a position symmetrical with the aerial image 13 through a reflecting surface (mirror surface) 41 of the second reflecting mirror 39 corresponds to the position of the aerial image 13 when light emitted from the optical image formation means 12 (the second optical control unit 19) is directly formed into an image in the air without being reflected by the second reflecting mirror 39.

Accordingly, the reflection-type aerial image formation device 10 and the reflection-type aerial image formation method can shorten the linear distance from the display means 11 to the optical image formation means 12 and the linear distance from the optical image formation means 12 to the aerial image 13 and reduce (miniaturize) the dimension in the height direction to about half by bending (folding) the optical path from the display means 11 to the optical image formation means 12 and the optical path from the optical image formation means 12 to the aerial image 13 by using the first reflecting mirror 38 and the second reflecting mirror 39. In addition, forming the aerial image 13 in the space surrounded by a housing 42 can improve the luminance and protect privacy because the aerial image 13 is difficult to visually recognize by others.

In addition, when the reflection-type aerial image formation device 10 is provided with a detection means 43 for detecting the position of an indication means (for example, a finger or touch pen) that touches the aerial image 13, the device can detect, with the detection means 43, the position on the aerial image 13 which is indicated by the indication means and cause a personal computer or the like (not shown) to execute processing (instruction) corresponding to the indicated position, thereby allowing the aerial image 13 to function as an aerial touch panel (non-contact input screen). In this embodiment, an optical proximity sensor formed in a flat bar shape (reed shape), such as zForce (registered trademark) AIR touch sensor or AIRBAR (registered trademark), is placed as the detection means 43 along one side (the lower side in this case) of the outer periphery of the aerial image 13. However, the detection means is not limited to them. A detection means to be used is appropriately selected, and each selected detection means is placed at a different position depending on the structure (shape) of each detection means and a detection method to be used. For example, as a detection means, it is possible to use a frame-shaped sensor (a kind of optical proximity sensor) that is formed in a frame shape along the outer periphery of an aerial image and has a plurality of light-emitting elements and a plurality of light-receiving elements around the aerial image, an infrared motion sensor, or the like.

Figure 3:
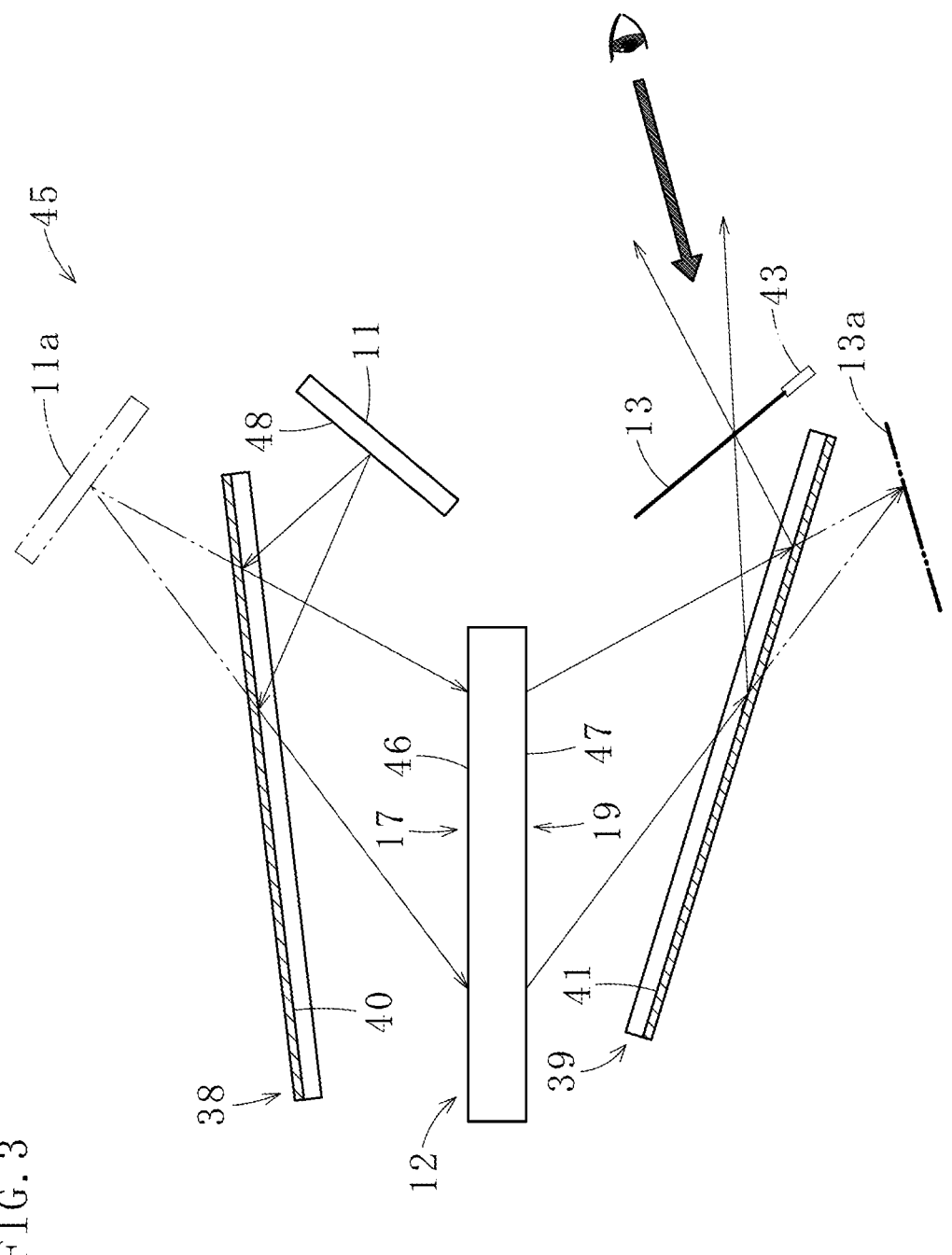
FIG. 3 is a view for explaining a modification of the reflection-type aerial image formation device.

In this embodiment, the first optical control unit 17 and the second optical control unit 19 are respectively placed on the lower surface side and the upper surface side of the optical image formation means 12, and the first reflecting mirror 38 and the second reflecting mirror 39 are respectively placed on the lower side and the upper side of the optical image formation means 12 in accordance with the first optical control unit 17 and the second optical control unit 19. However, like a reflection-type aerial image formation device 45 according to a modification shown in FIG. 3, the positions of the first reflecting mirror 38 and the second reflecting mirror 39 may be vertically interchanged with respect to the optical image formation means 12. In this embodiment, a light entrance surface 46 (one surface of the transparent flat plate 15) and a light exit surface 47 (the other surface of the transparent flat plate 15) of the optical image formation means 12, the reflecting surface 40 of the first reflecting mirror 38, and the reflecting surface 41 of the second reflecting mirror 39 are all arranged parallel to each other (see FIG. 1). However, like the reflection-type aerial image formation device 45, the angle formed by the light entrance surface 46 of the optical image formation means 12 and the reflecting surface 40 of the first reflecting mirror 38 and the angle formed by the light exit surface 47 of the optical image formation means 12 and the reflecting surface 41 of the second reflecting mirror 39 can be appropriately selected. In addition, the angle formed by a display surface 48 of the display means 11 and a reflecting surface 40 of the first reflecting mirror 38 can be appropriately selected. Appropriately selecting the placement angles of the display means 11, the optical image formation means 12, the first reflecting mirror 38, and the second reflecting mirror 39 makes it possible to select (set) the angle formed by the aerial image 13 and a horizontal plane. In addition, the reflection-type aerial image formation device 10 and the reflection-type aerial image formation device 45 each can be used while being inclined at a desired angle with respect to a horizontal plane. Rotating each device through 90° in particular can thin the device by minimizing the depth dimension of the device.

A reflection-type aerial image formation device 50 and a reflection-type aerial image formation method according to the second embodiment will be described next with reference to FIG. 4. Note that the same reference numerals denote the same constituent elements as those of the first embodiment, and a description thereof will be omitted.

Figure 4:
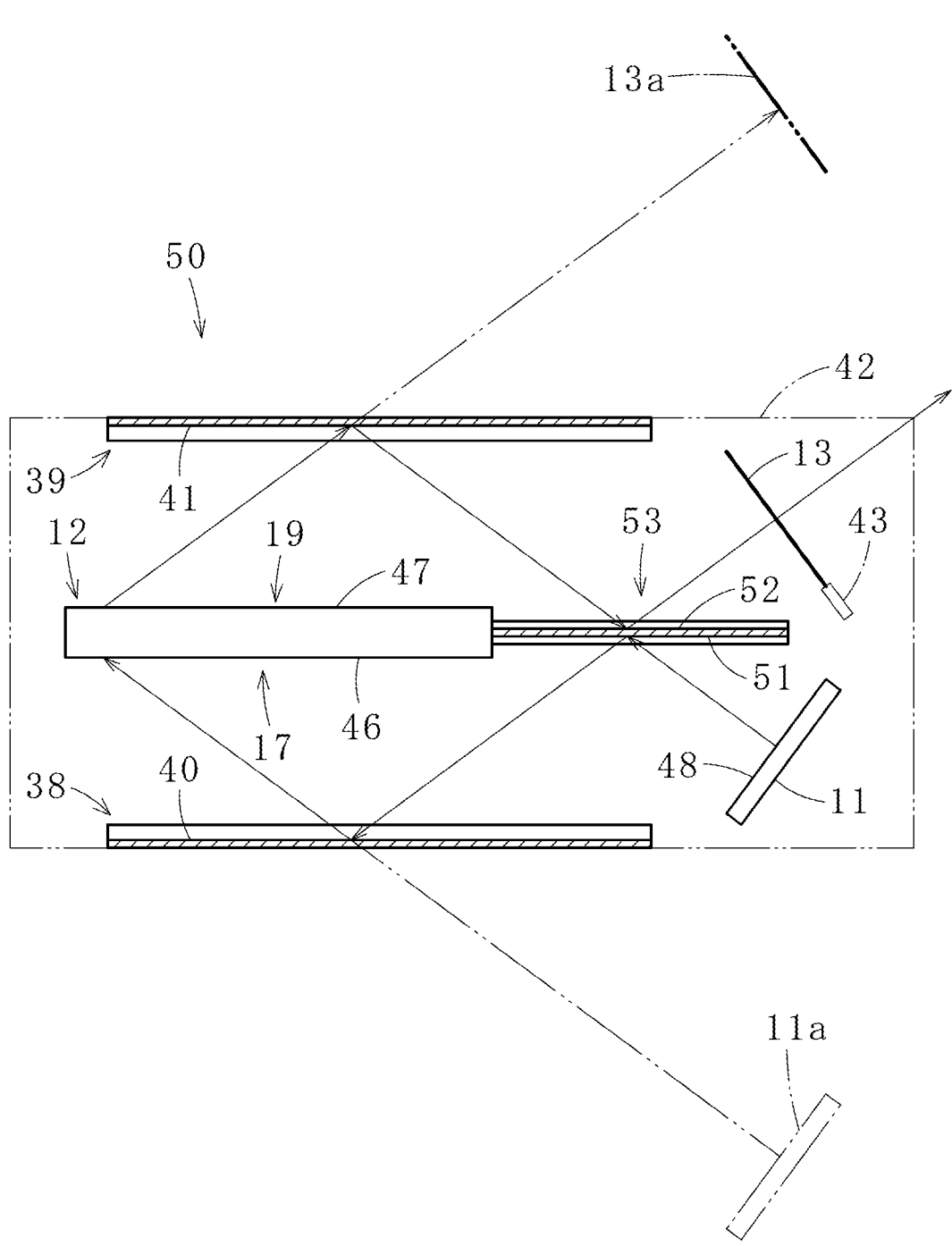
FIG. 4 is a view for explaining a reflection-type aerial image formation device according to the second embodiment of the present invention.

The reflection-type aerial image formation device 50 and the reflection-type aerial image formation method according to the second embodiment shown in FIG. 4 differ from the reflection-type aerial image formation device 10 and the reflection-type aerial image formation method according to the first embodiment in that a third reflecting mirror 53 respectively having, on the obverse and reverse sides, a first reflecting surface 51 facing a first reflecting mirror 38 and a second reflecting surface 52 facing a second reflecting mirror 39 is placed between the first reflecting mirror 38 and the second reflecting mirror 39 at a position where the third reflecting mirror does not overlap an optical image formation means 12, light emitted from a display means 11 is reflected by the first reflecting surface 51 to irradiate the first reflecting mirror 38, and the light exiting from a second optical control unit 19 and reflected by the second reflecting mirror 39 is reflected by the second reflecting surface 52 to be formed into an image.

In this manner, the light emitted from the display means 11 is reflected by the first reflecting surface 51 to irradiate the first reflecting mirror 38 by using the third reflecting mirror 53 respectively having, on the obverse and reverse sides, the first reflecting surface 51 facing the first reflecting mirror 38 and the second reflecting surface 52 facing the second reflecting mirror 39, and the light exiting from the optical image formation means 12 (the second optical control unit 19) and reflected by the second reflecting mirror 39 is reflected by the second reflecting surface 52 to be formed into an image, thereby forming a sharp aerial image 13 with excellent visibility without reducing the viewing angle while further increasing the optical path from the display means 11 to the optical image formation means 12 and the optical path from the optical image formation means 12 to the aerial image 13 as compared with the reflection-type aerial image formation device 10.

Although the embodiments of the present invention have been described above, the present invention is not limited to the configurations of the above embodiments at all and includes other embodiments and modifications within the scope of the claims.

For example, in the second embodiment, the light emitted from the display means is reflected once by each of the reflecting surface of the first reflecting mirror, the reflecting surface of the second reflecting mirror, and the first and second reflecting surfaces of the third reflecting mirror. However, the light may be reflected a plurality of times by any one or more of the reflecting surfaces to further increase the length of the optical path.

INDUSTRIAL APPLICABILITY

According to the reflection-type aerial image formation device and the reflection-type aerial image formation method according to the present invention, it is possible to miniaturize and thin the device and form a sharp aerial image with excellent visibility. The reflection-type aerial image formation devices according to the present invention can be applied to devices using aerial images, for example, medical devices, home electrical appliances, vehicles, aircraft, ships, game play equipment, advertising pillars, and non-contact touch panels and can downsize the devices as a whole.

REFERENCE SIGNS LIST

10: reflection-type aerial image formation device, 11: display means, 11*a*: virtual image, 12: optical image formation means, 13: aerial image, 13*a*: virtual image, 15: transparent flat plate, 16: first light reflecting surface, 17: first optical control unit, 18: second light reflecting surface, 19: second optical control unit, 21: first transparent plate member, 22: second transparent plate member, 23: inclined surface, 24: vertical surface, 25: groove, 26: ridge, 30: inclined surface, 31: vertical surface, 32: groove, 33: ridge, 36: transparent resin, 37: metal film, 38: first reflecting mirror, 39: second reflecting mirror, 40, 41: reflecting surface (mirror surface), 42: housing, 43: detection means, 45: reflection-type aerial image formation device, 46: light entrance surface, 47: light exit surface, 48: display surface, 50: reflection-type aerial image formation device, 51: first reflecting surface, 52: second reflecting surface, 53: third reflecting mirror

The invention claimed is:

1. A reflection-type aerial image formation device that uses optical image formation means obtained by overlaying a first optical control unit having a plurality of first light reflecting surfaces arranged parallel at intervals inside a transparent flat plate so as to be perpendicular to one surface of the transparent flat plate on a second optical control unit having a plurality of second light reflecting surfaces arranged parallel at intervals inside the transparent flat plate so as to be perpendicular to the other surface of the transparent flat plate, with the first and second optical control units being overlaid on each other in a thickness direction of the transparent flat plate so as to make the first light reflecting surfaces orthogonal to the second light reflecting surfaces in planar view, characterized by comprising:

a first reflecting mirror placed on a side of the first optical control unit of the optical image formation means so as to face the first optical control unit at an interval; and a second reflecting mirror placed on a side of the second optical control unit of the optical image formation means so as to face the second optical control unit at an interval, wherein light emitted from display means and irradiating the first reflecting mirror is reflected by the first reflecting mirror to be made incident on the first optical control unit, and light, of the light incident on the first optical control unit, which is reflected once by the first light reflecting surface to be made incident on the second optical control unit and reflected once by the second light reflecting surface to exit from the second optical control unit is reflected by the second reflecting mirror to form an image displayed on the display means into an aerial image, and wherein the display means and the aerial image are placed between the first reflecting mirror and the second reflecting mirror.

2. The reflection-type aerial image formation device according to claim 1, characterized by further comprising a third reflecting mirror that is placed between the first reflecting mirror and the second reflecting mirror at a position where the third reflecting mirror does not overlap the optical image formation means and has, on obverse and reverse sides, a first reflecting surface facing the first reflecting mirror and a second reflecting surface facing the second reflecting mirror, wherein light emitted from the display means irradiates the first reflecting mirror upon being reflected by the first reflecting surface, and light exiting from the second optical control unit and reflected by the second reflecting mirror is reflected by the second reflecting surface to be formed into an image.

3. The reflection-type aerial image formation device according to claim 2, characterized by further comprising detection means for detecting a position of indication means that touches the aerial image.

4. The reflection-type aerial image formation device according to claim 1, characterized by further comprising detection means for detecting a position of indication means that touches the aerial image.

5. A reflection-type aerial image formation method that uses optical image formation means obtained by overlaying a first optical control unit having a plurality of first light reflecting surfaces arranged parallel at intervals inside a transparent flat plate so as to be perpendicular to one surface of the transparent flat plate on a second optical control unit having a plurality of second light reflecting surfaces arranged parallel at intervals inside the transparent flat plate so as to be perpendicular to the other surface of the transparent flat plate, with the first and second optical control units being overlaid on each other in a thickness direction of the transparent flat plate so as to make the first light reflecting surfaces orthogonal to the second light reflecting surfaces in planar view, characterized in that a first reflecting mirror is placed on a side of the first optical control unit of the optical image formation means so as to face the first optical control unit at an interval, a second reflecting mirror is placed on a side of the second optical control unit of the optical image formation means so as to face the second optical control unit at an interval, light emitted from display means and irradiating the first reflecting mirror is reflected by the first reflecting mirror to be made incident on the first optical control unit, and light, of the light incident on the first optical control unit, which is reflected once by the first light reflecting surface to be made incident on the second optical control unit and reflected once by the second light reflecting surface to exit from the second optical control unit is reflected by the second reflecting mirror to form an image displayed on the display means into an aerial image, wherein the display means and the aerial image are placed between the first reflecting mirror and the second reflecting mirror.

6. The reflection-type aerial image formation method according to claim 5, characterized in that a third reflecting mirror having, on obverse and reverse sides, a first reflecting surface facing the first reflecting mirror and a second reflecting surface facing the second reflecting mirror is placed between the first reflecting mirror and the second reflecting mirror at a position where the third reflecting mirror does not overlap the optical image formation means, the first reflecting mirror is irradiated with light emitted from the display means upon being reflected by the first reflecting surface, and light exiting from the second optical control unit and reflected by the second reflecting mirror is formed into an image upon being reflected by the second reflecting surface.

* * * * *